US006986066B2

(12) United States Patent
Morrow et al.

(10) Patent No.: US 6,986,066 B2
(45) Date of Patent: Jan. 10, 2006

(54) COMPUTER SYSTEM HAVING LOW ENERGY CONSUMPTION

(75) Inventors: Lewis A. Morrow, Wellesley, MA (US); Claus M. Olsen, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 575 days.

(21) Appl. No.: 09/755,861

(22) Filed: Jan. 5, 2001

(65) Prior Publication Data

US 2002/0124196 A1     Sep. 5, 2002

(51) Int. Cl.
    *G06F 9/46* (2006.01)
(52) U.S. Cl. ........................ 713/320; 718/102
(58) Field of Classification Search ........... 713/300, 713/320, 322, 324, 340, 323; 709/102, 104; 718/1, 100, 102
See application file for complete search history.

(56) References Cited

U.S. PATENT DOCUMENTS

| | | | | |
|---|---|---|---|---|
| 4,954,945 A | * | 9/1990 | Inoue | 709/105 |
| 5,142,684 A | | 8/1992 | Perry et al. | |
| 5,790,817 A | | 8/1998 | Asghar et al. | |
| 6,314,447 B1 | * | 11/2001 | Lea et al. | 718/105 |
| 6,501,999 B1 | * | 12/2002 | Cai | 700/82 |
| 6,631,474 B1 | * | 10/2003 | Cai et al. | 713/300 |

FOREIGN PATENT DOCUMENTS

JP         06110857 A   *  4/1994

\* cited by examiner

*Primary Examiner*—Lynne H. Browne
*Assistant Examiner*—Paul Yanchus, III
(74) *Attorney, Agent, or Firm*—F. Chau & Associates, LLC

(57) ABSTRACT

The energy consumption of a computing system is reduced by incorporating two or more processing units with diverse energy efficiencies and diverse processing capabilities. A scheduler intercepts an interrupt(s) from I/O space, resolves the interrupt to a task, retrieves energy and performance attributes for the task, and schedules the task for execution on the processing units such that the task will consume the least amount of energy while executing in a timely fashion.

32 Claims, 4 Drawing Sheets

| Parameter | Type | Unit | Description |
|---|---|---|---|
| TID | word | n/a | Task IDentification number |
| NP | byte | n/a | Number of potential host processing units |
| $P_{TID,1}$ | byte | n/a | ID of most energy efficient processor |
| $CPS_{TID,P_{TID,1}}$ | word | [kHz] | Required cycles/sec to sustain task |
| $ADDR_1$ | void* | n/a | Pointer to task code |
| . | | | |
| . | | | |
| . | | | |
| $P_{TID,NP}$ | byte | n/a | ID of least energy efficient processor |
| $CPS_{TID,P_{TID,NP}}$ | word | [kHz] | Required cycles/sec to sustain task |
| $ADDR_{NP}$ | void* | n/a | Pointer to task code |

FIG. 2

| Parameter | Type | Unit | Description |
|---|---|---|---|
| N | byte | n/a | Number of processing units |
| $CPS_1$ | word | [kHz] | Currently available cycles/sec |
| . | | | |
| . | | | |
| . | | | |
| $CPS_{NP}$ | word | [kHz] | Currently available cycles/sec |

FIG. 3

COMPUTER SYSTEM HAVING LOW ENERGY CONSUMPTION

BACKGROUND

1. Technical Field

The present invention relates generally to computer systems and, in particular, to a computer system having low energy consumption.

2. Background Description

In recent years, pervasive devices (PvDs) have become increasingly popular. The wireless capabilities of these devices are increasing as well as the computational complexity required by certain tasks. A major obstacle to the success of pervasive devices is energy consumption, since pervasive devices are typically powered by batteries. In general, a battery in a pervasive device may last anywhere from one hour to one year depending on the use(s) of the pervasive device. If the pervasive device is used for speech recognition and/or to support high speed wireless connectivity, it is inevitable that the energy consumption will go up significantly. The reason for this is that moderate to high performance processing units are needed to support the Million Instructions Per Second (MIPS) required by such tasks. Unfortunately, as performance goes up, energy efficiency goes down. As used herein, the phrase "energy efficiency" is directed to joules-per-task (JPT) (and other equivalents).

Despite all the high performance and complex tasks that current pervasive devices are capable of performing, the majority of a typical pervasive device's life is spent doing simple low performance tasks such as updating the time register, periodically exchanging location information with wireless base station, sampling the ambient temperature, logging a GPS location stamp, fetching an address book entry, updating the screen buffer, detecting a keypad input, and so forth. Executing such simple tasks on a high performance processor is extremely inefficient in terms of JPT.

Thus, there have been a number of attempts to run processing units in a energy conscious manner. For example, some processor manufacturers (see, e.g., T. R. Halfhill, "Transmeta Breaks x86 Low-Power Barrier", Microprocessor Report, p. 1, February 2000; and S. Liebson, "Xscale (StrongARM-2) Muscles In", Microprocessor Report, p. 1, February 2000) have produced more energy efficient processing units wherein the energy consumption per cycle can be adjusted by changing supply voltage and frequency in tandem, also known as voltage scaling (see, e.g., Brodersen et al., "Low Power Digital CMOS Design", Kluwer Academic Publishers, 1995). However, there are limits to how slow these processing units can be made to run or, rather, to how low the supply voltage can be driven. Therefore, if these processing units are primarily used to execute simple low performance tasks, then they would still dissipate significantly more energy than processing units specifically designed to execute such simple tasks.

"Further, some mobile telephone and portable radio manufacturers (see, e.g., U.S. Pat. No. 5,487,181, issued on Jan. 23, 1996, assigned to Ericsson GE Mobile Communications Inc., Lynchburg, Va., the disclosure of which is incorporated herein by reference; and U.S. Pat. No. 5,058,203, issued on Oct. 15, 1991, assigned to Fujitsu Limited, Kawasaki, Japan, the disclosure of which is incorporated herein by reference) have proposed to use energy efficient application specific integrated circuits (ASIC) to offload the less energy efficient main processor in performing frequently occurring and routine functions. However, this approach for reducing energy consumption is not suitable for a more generic and more configurable computing platform which is intended to offer a high degree of flexibility to the user. In a highly flexible computing system, the user may change functionality and install new features on the fly (e.g., the desktop user paradigm). The proposed conventional solutions are not flexible systems. Rather, they are systems with specific and limited functionality.

Accordingly, there is still a need for a generic configurable computing platform having low energy consumption irrespective of system functionality demands by users, which can download new application code for evaluation and subsequent execution in the most energy efficient manner.

SUMMARY OF THE INVENTION

The problems stated above, as well as other related problems of the prior art, are solved by the present invention, a computer system having low energy consumption.

The invention provides reduced energy consumption in generic and highly configurable computing systems. Examples of some of the target computing systems that would benefit from the invention include, for example, personal digital assistants (PDAs), handheld computers, pocket computers, portable phones, laptop computers, wearable computers, and so forth. Further, the invention is particularly applicable to computing systems which are designed for a high degree of user flexibility (e.g., systems in which the user can download new applications, create his/her own applications, and/or customize the system to his/her needs). It is to be appreciated that the preceding types of computer systems and/or computer system features are merely illustrative; the invention is applicable to many other types of computer systems having the above and/or other features, as is readily apparent to one of ordinary skill in the related art.

According to a first aspect of the invention, a computer system is provided. The computer system includes at least two processing units having different energy efficiencies and adapted to at least execute tasks based upon processing requirements of the tasks and a corresponding processing capability. A scheduler is adapted to schedule a given task for execution by one of the at least two processing units so as to consume a least amount of energy, and to reschedule the given task for execution by an other of the at least two processing units when a determination indicates that the one of the at least two processing units is unable to accommodate execution of the given task based upon the processing requirements of the given task and the corresponding processing capability.

According to a second aspect of the invention, the processing requirements comprise an end time at which the given task is to be completed.

According to a third aspect of the invention, the scheduler is a function embodied within a hardware component other than the at least two processing units.

According to a fourth aspect of the invention, one of the at least two processing units include the scheduler.

According to a fifth aspect of the invention, the scheduler is further adapted to intercept interrupts from the at least two processing units and peripheral devices.

According to a sixth aspect of the invention, the at least two processing units share memory space.

According to a seventh aspect of the invention, the at least two processing units share input/output space.

According to an eighth aspect of the invention, the at least two processing units share input/output space, and the scheduler and the at least two processing units share memory space.

According to a ninth aspect of the invention, the computer system further includes a task attribute store adapted to store at least some of the processing requirements of at least some of the scheduled tasks.

According to a tenth aspect of the invention, the determination is made by the scheduler.

According to an eleventh aspect of the invention, the determination is made by the one of the at least two processing units.

According to a twelfth aspect of the invention, the at least two processing units are further adapted to one of accept and reject the tasks for execution.

According to a thirteenth aspect of the invention, the processing requirements include a processing capacity required to execute the given task.

According to a fourteenth aspect of the invention, a computer system is provided. The computer system includes a plurality of processing units. Each of the plurality of processing units is adapted to execute tasks thereon. At least two of the plurality of processing units have different energy efficiencies. A scheduler is adapted to schedule a given task for execution by one of the plurality of processing units by querying the plurality of processing units in a partial order of descending energy efficiency to one of accept and reject the execution of the given task until one of the given task is one of accepted and executed by the one of said plurality of processing units and the given task is rejected by all of the plurality of processing units.

According to a fifteenth aspect of the invention, a computer system is provided. The computer system includes at least two processing units having different energy efficiencies and adapted to one of accept and reject scheduled tasks based upon processing requirements of the scheduled tasks and a corresponding processing capability. The at least two processing units are also adapted to at least execute the scheduled tasks that are accepted. A scheduler is adapted to schedule a given task for execution by one of the at least two processing units so as to consume a least amount of energy, and to rescheduled the given task for execution by an other of the at least two processing units when the one of the at least two processing units rejects the execution of the given task.

According to a sixteenth aspect of the invention, a computer system is provided. The computer system includes a plurality of processing units. Each of the plurality of processing units is adapted to execute tasks thereon. At least two of the plurality of processing units have different energy efficiencies. A processor attribute table is adapted to store processing capability information for at least some of the plurality of processors and to update the processing capability information dynamically when the processing capability information changes. A scheduler is adapted, for a given task, to retrieve at least some of the processing capability information from the processor attribute table in one of a partial order and a strict order of descending energy efficiency until one of the plurality of processors is found to possess adequate processing capability with respect to task processing requirements for the given task. The scheduler is also adapted to schedule the given task for execution by the one of the plurality of processors.

These and other aspects, features and advantages of the present invention will become apparent from the following detailed description of preferred embodiments, which is to be read in connection with the accompanying drawings.

BRIEF DESCRIPTION OF THE DRAWINGS

FIG. 2 is a diagram illustrating a task attribute list according to an illustrative embodiment of the invention;

FIG. 3 is a diagram illustrating a processor attribute list according to an illustrative embodiment of the invention;

DETAILED DESCRIPTION OF PREFERRED EMBODIMENTS

Figure 1:
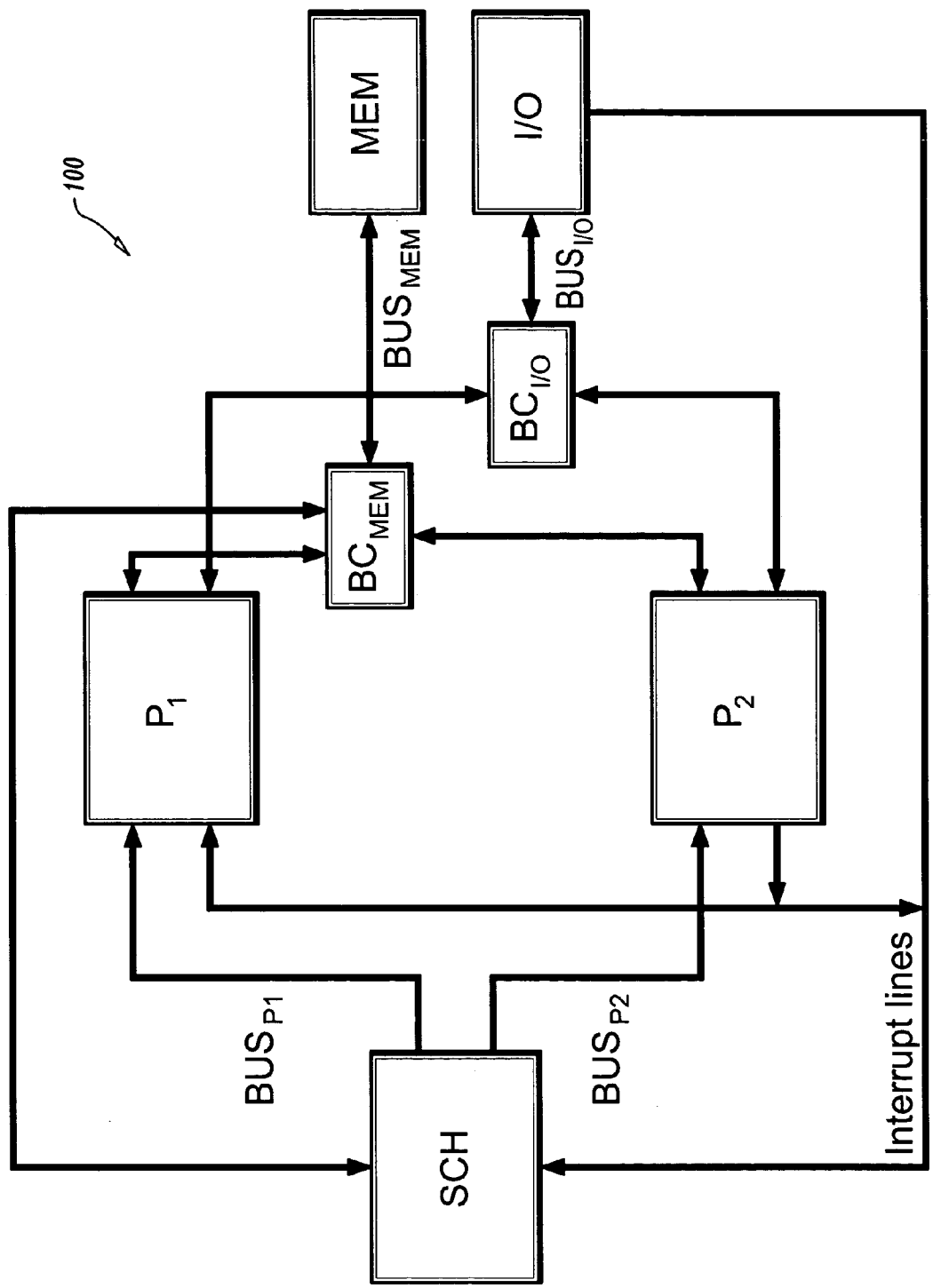
FIG. 1 is a block diagram illustrating a computer system 100 having low energy consumption, according to an illustrative embodiment of the invention.

The present invention is directed to a computer system having low energy consumption. It is to be understood that the present invention may be implemented in various forms of hardware, software, firmware, special purpose processing units, or a combination thereof. Preferably, the present invention is implemented as a combination of both hardware and software. The software may be implemented as an application program tangibly embodied on a program storage device. The application program may be uploaded to, and executed by, a machine comprising any suitable architecture. Preferably, the machine is implemented on a computer platform having hardware such as central processing units (CPUs), a random access memory (RAM), and input/output (I/O) interface(s). The computer platform may also include an operating system and/or micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying Figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

A general description of the present invention will now be provided to introduce the reader to the concepts of the invention. Subsequently, more detailed descriptions of various aspects of the invention will be provided with respect to FIGS. 1 through 5.

To facilitate a clear understanding of the present invention, definitions of terms employed herein will now be given. The term "processing unit" is defined as a microprocessor, a microcontroller, a digital signal processor, or other device capable of executing instructions. Any combination of the preceding elements may also be employed. Also, the term "functional block" is defined as a digital or mixed signal circuit that is capable of performing one or more specific functions, but is not capable of executing instructions; moreover, the functionality of a functional block cannot be changed. An application specific integrated circuit (ASIC), a fast fourier transform (FFT), and a combinatorial circuit are considered functional blocks for the purposes of the invention. It is to be appreciated that a processing unit cannot be a functional unit, and a functional unit cannot be a processing unit. Further, the term "task" is defined as a code portion that be independently executed concurrently with other tasks or alone. Using this definition, for example, applications, threads, interrupt service routines and the operating system kernel may be regarded as tasks. Given the teachings of the invention provided herein, one of ordinary skill in the related art will contemplate these and various other implementations of the elements of the invention, while maintaining the spirit and scope thereof.

FIG. 1 is a block diagram illustrating a computer system 100 having low energy consumption, according to an illustrative embodiment of the invention. The computer system 100 includes 2 processing units, $P_1$ and $P_2$ (hereinafter also generically referred to as "processing unit $P_j$"), and a scheduling unit, SCH. $P_1$ and $P_2$ execute tasks. $P_1$ is the most energy efficient processing unit, but has a low computing performance. $P_2$ is the least energy efficient processing unit, but has a high computing performance. All interrupts from I/O space and from the two processing units are brought to SCH. MEM is the memory space and I/O is the I/O space. $BUS_{P1}$, $BUS_{P2}$, $BUS_{MEM}$, and $BUS_{I/O}$ are the scheduler to P1 bus, scheduler to P2 bus, the memory bus, and the I/O bus, respectively. $BC_{MEM}$ and $BC_{I/O}$ are the memory bus controller and the I/O bus controller, respectively. In a preferred embodiment of the invention, the processing units P1 and P2 are executing concurrently and each processing unit has a multitasking operating system running on it.

While SCH is implemented as a separate functional block in the illustrative embodiment of FIG. 1, it is to be appreciated that the functionality of SCH may be implemented as part of the other processing units (e.g., $P_1$ and/or $P_2$), as a software program(s), or a combination thereof. For example, SCH may be implemented as a function (software, series of logic components, and so forth) within a hardware component (e.g., any functional block or processing unit). Given the teachings of the invention provided herein, one of ordinary skill in the art will contemplate these and various other implementations of SCH while maintaining the spirit and scope of the invention.

A brief description of the operation of computer system 100 according to an illustrative embodiment of the invention will now be given. SCH intercepts all interrupt signals, resolves the interrupt to a task identification number (TID), and then negotiates execution of the task with the processing units, $P_1$ and $P_2$, selecting the processing unit with the lowest energy consumption to execute and complete the task in a timely manner. In order for SCH and $P_3$ to perform such a negotiation, certain characteristics about the task at hand should be known. These characteristics and other task related information are supplied in a tasks attribute list. FIG. 2 is a diagram illustrating a task attribute list according to an illustrative embodiment of the invention. It is SCH's responsibility to retrieve certain task attributes at interrupt time. Illustrative task attributes are shown and described in further detail hereinbelow with reference to FIG. 2.

TID is the task identification number of the task at hand. NP is the number of processing units that are able to execute the task. $P_{TID,1}$ is the ID of the most energy efficient processing unit able to execute the task. $CPS_{TID,1}$ is the worst case number of processing unit cycles needed to run the task in a timely fashion. $ADDR_{TID,1}$ is the address of the location of the task. $P_{TID,i}$ is the i'th most energy efficient processing unit able to execute the task, where 1<=i<=NP. $CPS_{TID,i}$ is the worst case number of processing unit cycles needed to run the task in a timely fashion. $ADDR_{TID,1}$ is the address of the location of the task. $P_{TID,NP}$ is the least energy efficient processing unit of the NP processing units able to execute the task. CPSTID,NP is the worst case number of processing unit cycles needed to run the task in a timely fashion. $ADDR_{TID,NP}$ is the address of the location of the task. Note that, in principle, ADDR may be different for each processing unit if the processing units are not of the same architecture. For example, it is not uncommon that two different processing units have different instruction sets, and/or that one processing unit has a 32-bit architecture and the other processing unit has an 8-bit architecture.

It is to be emphasized that CPS represents a worst case value. For example, suppose that the user launches a DateBook application which lists a number of DateBook entries. The corresponding task will be busy for a second or so and then it will be in idle mode, and the DateBook list of entries are now visible on the display. Then, the user selects an entry for which he or she desires more detailed information. The task then fetches information from the database, displays the information on the display, and returns to idle mode. Therefore, CPS can be described as relating to such a task as follows: CPS represents the necessary speed capability of the processing unit with respect to the task reacting to the users input request, fetching the information from the database, and finally displaying the information on the display. However, for the majority of the time, the task is in idle mode.

SCH will negotiate with processing units $P_1$ and $P_2$ in the order that the processing units are listed in the attribute list. Thus, with respect to the illustrative task attribute list of FIG. 2, SCH will negotiate with the most energy efficient processing unit, $P_{TID,1}$. $P_{TID,1}$ will then quickly determine if it can handle the task in question given the constraints on the required cycles per second, CPS. $P_{TID,1}$ will then either accept or reject the task. If $P_{TID,1}$ rejects the task or, if after a while, $P_{TID,1}$ determines that it will not be able to complete the task in due time, $P_{TID,1}$ will then interrupt SCH. SCH will then try (negotiate with) the next processing unit in the attribute list until one of the listed processing units accepts the task or until all listed processing units have been tried.

It is to be appreciated that the task attribute list is intended to enable the acceptance/rejection determination to be based upon the processing requirements of a given task to be executed and the processing capability of the processor that is to execute the given task. The processing requirements may include, for example, a minimum processing capacity necessary to execute the task, a deadline time by which the task must have been executed, a specific bit-width of the data path, and so forth. The processing capability may include a currently available processing capacity, a current bit-width of the data path, and so forth. Given the teachings of the invention provided herein, these and various other processing requirements and processing capabilities are readily contemplated by one of ordinary skill in the related art while maintaining the spirit and scope of the invention.

It is to be further appreciated that the actual decision of whether a given processor can execute a given task may be made by the processor that is queried to accept the task or by SCH. It is preferable if such decision is made based upon the processing requirements of the task and the processing capabilities of the processor, with the processing requirements being described in the task attribute list, and with the processing capabilities either accessible only by the processor or accessible also be the scheduler from a commonly shared processor attribute list. FIG. 3 is a diagram illustrating a processor attribute list suitable for access by SCH. In FIG. 3, N is the number of processing units, and CPSj is the current maximum available processing capacity of processor j, where 1<=j<=N. The processor attribute list must be dynamically updated by the respective processors at the time the processors either accept a new task or at the time they terminate a task, so that the values in the attribute list represent near instantaneous processing capabilities of the respective processors. Of course, some of the processing requirements and/or the processing capabilities may also be stored for future reference in storage structures other than the task attribute and processor attribute lists. Given the teachings of the invention provided herein, one of ordinary skill in the related art will contemplate these and various other modifications to the elements of the invention while maintaining the spirit and scope thereof.

For ease of understanding, the following presumptions/conditions are imposed with respect to interrupts. SCH handles one I/O interrupt at a time. An I/O interrupt cannot preempt the handling of another I/O interrupt, nor can an I/O interrupt preempt the handling of a Processor interrupt. I/O interrupts are queued in the order in which they are received. Processor interrupts have priority over I/O interrupts.

Figure 4:
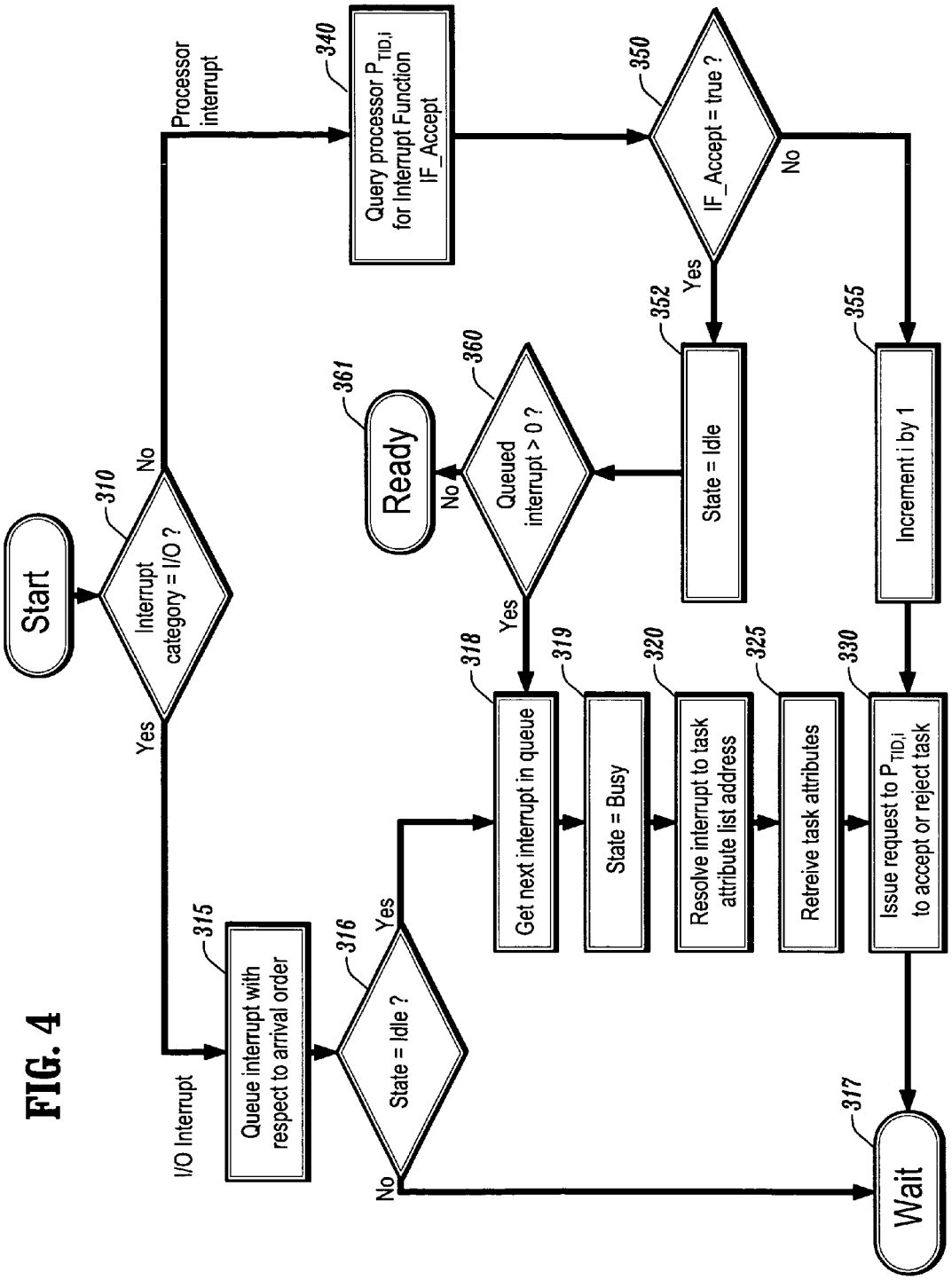
FIG. 4 is a flow diagram illustrating task scheduling by a scheduling unit SCH, according to an illustrative embodiment of the invention.

FIG. 4 is a flow diagram illustrating task scheduling by SCH, according to an illustrative embodiment of the invention.

Upon receiving an interrupt, the category thereof is determined (step 310) If the interrupt is an I/O interrupt, then it is queued with respect to its order of arrival (step 315).

It is then determined whether the state of SCH is Idle (step 316). If not (i.e., if the state of SCH is Busy), then the SCH enters the Wait mode (step 317). In the Wait mode, SCH cannot service other I/O interrupts, although SCH does allow for queuing of I/O interrupts as described above with respect to step 315.

However, if SCH is in the Idle state, then SCH proceeds to retrieve the next interrupt in the queue (step 318), which by default will be the just received I/O interrupt. Next, the Busy state is entered (step 319).

The interrupt is resolved to a task attribute list address by SCH querying an interrupt vector table (step 320). The task attributes for the task are then retrieved (step 325). SCH then issues a request to the first processing unit listed in the attribute list to accept or reject the task (with task ID, TID) associated with the current I/O interrupt (step 330). During steps 319 through 330, SCH is in the Busy state. Upon performing step 330, SCH then enters the Wait mode (step 317). Basically, while SCH is in the Wait mode, SCH is waiting for the current processing unit to reply whether it is going to accept or reject the task (with task ID, TID) associated with the current I/O interrupt.

The current processing unit replies to SCH by generating a Processor interrupt which, as noted above, takes priority over I/O type interrupts. Thus, upon determining the category of the received interrupt as a Processor interrupt (step 310), the Processor interrupt is then processed immediately. SCH queries processing unit $P_{TID,i}$ for the Interrupt Function, IF_Accept (step 340). According to the illustrative embodiment of FIG. 4, an interrupt function IF_Accept returns a Boolean value of true if the processing unit has accepted the task, and a Boolean value of false if the processing unit has rejected the task. It is then determined whether the Boolean value returned by the Interrupt Function IF_Accept is true or false.

If IF_Accept is true, then SCH returns to the Idle state (step 352). Next, SCH checks if there are more I/O interrupts in the queue (step 360). If there are no more interrupts in the queue, then SCH enters into the Ready mode where it simply waits for another I/O interrupt (step 361). Otherwise, if there are more interrupts, then the method returns to step 318 where the next I/O interrupt in the queue is retrieved.

If IF_Accept is false, then the value of i is incremented by one (step 355), and the method returns to step 330 (so that SCH can issue a request to the next processing unit listed in the attribute list to accept or reject the task (with task ID, TID) associated with the current I/O interrupt).

Figure 5:
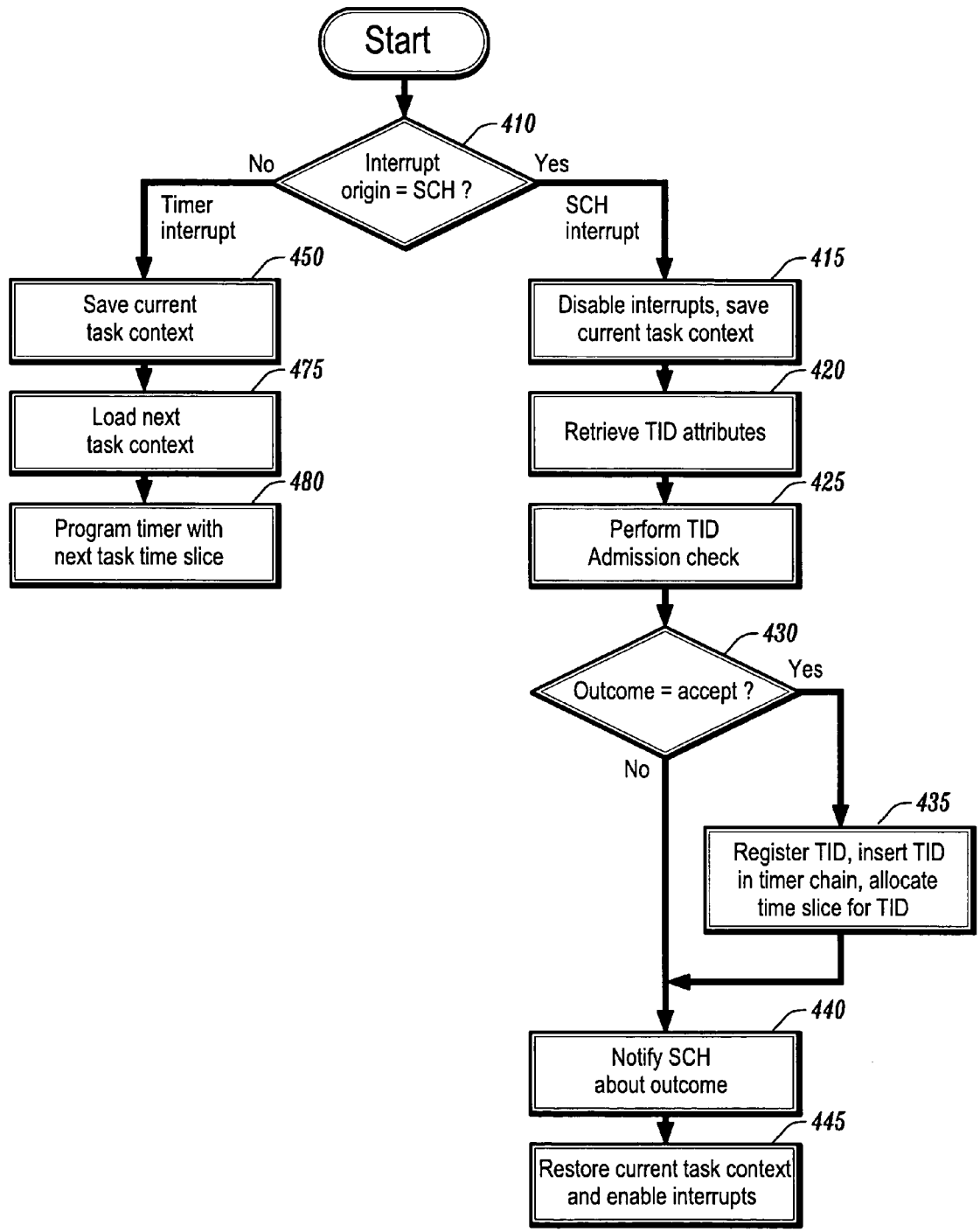
FIG. 5 is a flow diagram illustrating task handling by $P_J$ (i.e., processing units $P_1$ or $P_2$), according to an illustrative embodiment of the invention.

FIG. 5 is a flow diagram illustrating task handling by $P_j$ (i.e., processing units $P_1$ or $P_2$), according to an illustrative embodiment of the invention. For ease of understanding, certain presumptions are made as follows. A processing unit may be interrupted in two ways; by SCH and by the processor's local OS timer. An interrupt from SCH is always serviced immediately. The timer interrupt is also always serviced immediately, except if the processing unit $P_j$ is servicing an interrupt from SCH. The service time of a SCH interrupt is much faster than the OS master timer interrupt interval, T. OS code is stored locally, i.e., OS is not located in shared memory space, MEM.

Referring back to FIG. 4, it may be seen that SCH handles one I/O interrupt source at a time and that the interrupt causes SCH to negotiate with one or more processing units in a sequential fashion. Thus, SCH negotiates with one processing unit at a time and, therefore, at any given time, a maximum of one interrupt from SCH is being serviced by one of the processing units. An interrupt from SCH can never be queued in a processing unit, because SCH cannot issue another interrupt until a processing unit has completely serviced the current interrupt from SCH.

A brief description of task admission in $P_3$ will now be given, followed by a more detailed description with respect to FIG. 5. When processing unit $P_j$ receives an interrupt, processing unit $P_3$ first determines the origin of the interrupt (i.e., as coming from either SCH or by the local OS timer of the processing unit $P_j$). If the interrupt is the SCH interrupt, then the processing unit $P_3$ saves the current state in local memory and services the interrupt. Thus, an interrupt from SCH may preempt any other currently executing task. Upon returning from the SCH interrupt task, the processing unit $P_j$ resumes execution of the preempted task. While the processing unit $P_J$ is servicing a SCH interrupt, interrupts are disabled. If a timer interrupt should occur while the SCH interrupt is being serviced, then the timer interrupt will not be serviced until completion of the SCH interrupt.

Returning to FIG. 5, when processing unit $P_j$ receives an interrupt, it first determines the origin of the interrupt (step 410). Upon reception of a SCH interrupt, the processing unit $P_j$ disables interrupts, and saves the current program context (step 415). Then, the processing unit $P_j$ will retrieve relevant TID attributes needed for the TID Admission check (step 420). The relevant TID attributes include the CPS processing requirement associated with $P_j$. The address of the task attribute table may be passed to the processing unit by SCH (e.g., in step 325 in FIG. 4) through a shared buffer. The TID Admission check is then performed (step 425). The TID admission check may be performed by, for example, the use of Equation 1 described in detail hereinbelow. It is then determined whether or not the outcome of the Admission check is either a rejection or an acceptance of the TID (step 430). If the outcome is acceptance, then the TID is registered, the task pointer ADDR is inserted in the timer chain and a time slice is allocated for the TID (step 435) and the method proceeds to step 440. Otherwise, the method simply proceeds to step 440.

At step 440, SCH is notified of the outcome of the Admission check (i.e., decision of the processing unit $P_j$) by interrupting SCH and putting the Boolean outcome in a shared buffer that can be accessed by SCH. Then, the processing unit $P_j$ enables interrupts again and restores task context (step 445).

With respect to allocating a time slice at step 435, the same is calculated based upon the required computing capacity (CPS) of the task (retrieved in step 420) and upon the present load of the processing unit $P_j$. For illustrative purposes, one way to calculate the time slice is shown in Equation 2 which is described in detail hereinbelow.

If it is determined at step 410 that the received interrupt is a timer interrupt, then the current task context is saved (step 450), the next task in the timer chain is loaded (step 475) and the local timer is programmed to interrupt according to the time slice allocated for the next task (step 480). Thus, the registered tasks are executed in a sequential fashion. When the last task in the timer chain has been executed, the timer is programmed to interrupt at the next master timer interval, T, with which the tasks are periodically loaded for execution. Note that any registered task may be put into a dormant mode if needed (for example, if the user is not using an application) and thus be temporarily taken out of the timer chain to enable the processor to enter sleep mode as much as possible to save energy.

Regarding the Admission check of step 425, consider a processing unit, $P_j$, which currently has K tasks executing on it. Now consider a new task, $TID_{K+1}$, which SCH submits for consideration to $P_j$. From the new tasks attribute list it may be seen that $TID_{K+1}$ needs a computing capacity of at least $CPS_{TID_{K+1}}$. Thus, for the new task, $TID_{K+1}$, to be admitted on $P_j$, the expression in Equation 1 must be satisfied, where $CPS_{CLK}$ is the clock frequency of the processing unit, $CPS_{OS}$ is the CPS allocated for the operating system, $CPS_{SCH}$ is the CPS allocated for interacting with SCH (i.e., the admission routine consumes part of this allocation), and $CPS_{TID_k}$ is the CPS allocated for the k'th task currently executing on $P_j$. Note that all the parameters in Equation 1 are specific to $P_j$ and that the "$P_j$" suffix has been left out.

$$CPS_{TID_{K+1}} \leq CPS_{CLK} - CPS_{OS} - CPS_{SCH} - \sum_{k \leq K} CPS_{TID_k} \quad (1)$$

It should be noted that determining the required CPS of a task will, in many cases, be based on experimentation by the programmer. One way to determine the required CPS of a task is to launch the task on the target processing unit where there also is a so-called Throttle task running whose CPS can be adjusted. At first, maximum CPS is made available to the task, i.e., $CPS_{max}=CPS_{CLK}-CPS_{OS}-CPS_{SCH}-CPS_{THROTTLE}$ (=0). Then, the programmer gradually increases the Throttle CPS, thus reducing the available CPS of the task in question. In this fashion, the programmer is able to determine when the new task no longer operates in a satisfactory manner.

Regarding the task time slice, consider again a processing unit, $P_j$, that has K tasks executing on it. Now consider a new task, $TID_{K+1}$, which SCH submits for consideration on $P_j$. Further assume that each task, $TID_k$, is executed with the master time interval, T, which is managed by the local OS and facilitated by proper programming of the local timer.

Now, assuming $P_j$ admits the task, the new task, $TID_{K+1}$, will be allocated the time slice, $\Delta T_{K+1}$, according to Equation 2.

$$\Delta T_{K+1} = \frac{CPS_{TID_{K+1}}}{CPS_{CLK}} \cdot T \quad (2)$$

It is to be appreciated that the invention may be implemented such that the processing unit scheduled to execute a task is not the processing unit which consumes the least amount of energy, but is instead the second, third, and so on. That is, while the ultimate goal is to indeed select the most energy efficient processing unit, other processing units of "neighboring" energy efficiency may be selected for various reasons, as readily ascertainable by one of ordinary skill in the related art. For example, the most energy efficient processing unit may be busy handling another task or, for scheduling reasons, it is worthwhile to use the second, third, or Nth most energy efficient processing unit. Thus, the processing units may be queried to accept or reject a given task for execution based on a partial order of descending energy efficiency. The partial order means that some processing units may be selected out of order with respect to energy efficiency, may be excluded from consideration altogether, or any combination thereof. Given the teachings of the invention provided herein, one of ordinary skill in the related art will contemplate these and other variations, modifications, and extensions of task scheduling with respect to low energy consumption, while maintaining the spirit and scope of the invention.

It is to be further appreciated that the processing units described herein may be, for example, microprocessors, microcontrollers, digital signal processors (DSPs), or any other devices capable of executing instructions. Moreover, any combination of the preceding elements may be employed. Given the teachings of the invention provided herein, one of ordinary skill in the related art will contemplate these and various other implementations of the elements of the invention, while maintaining the spirit and scope thereof.

It is to be yet further appreciated that the processing units execute tasks scheduled by the scheduler and possibly other tasks which are not scheduled by the scheduler.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. A computer system comprising:
   at least two processing units having different energy efficiencies and adapted to at least execute tasks based upon processing requirements of the tasks and a corresponding processing capability; and
   a scheduler adapted to schedule a given task for execution by one of said at least two processing units so as to consume a least amount of energy, and to reschedule the given task for execution by an other of said at least two processing units when a determination indicates that said one of said at least two processing units is unable to accommodate execution of the given task based upon the processing requirements of the given task and the corresponding processing capability;

wherein said scheduler is further adapted to send a first request interrupt for execution of the given task to one of said at least two processing units in an order based on an attribute list;

wherein said one of said at least two processing units are further adapted to return one of an accept interrupt and a reject interrupt to said scheduler in response to said first request;

wherein said scheduler is further adapted to send a second request interrupt for execution of the given task to an other of the at least two processing units in the order based on the attribute list, if said scheduler receives the reject interrupt from said one of said at least two processing units.

2. The computer system according to claim 1, wherein the processing requirements comprise an end time at which the given task is to be completed.

3. The computer system according to claim 1, wherein said scheduler is a function embodied within a hardware component other than said at least two processing units.

4. The computer system according to claim 1, wherein one of said at least two processing units comprise said scheduler.

5. The computer system according to claim 1, wherein said scheduler is further adapted to intercept interrupts from said at least two processing units and peripheral devices.

6. The computer system according to claim 1, wherein said at least two processing units share memory space.

7. The computer system according to claim 1, wherein said at least two processing units share input/output space.

8. The computer system according to claim 1, wherein said at least two processing units share input/output space, and said scheduler and said at least two processing units share memory space.

9. The computer system according to claim 1, further comprising a task attribute store adapted to store at least some of the processing requirements of at least some of the scheduled tasks.

10. The computer system according to claim 1, wherein the determination is made by said scheduler.

11. The computer system according to claim 1, wherein the determination is made by said one of said at least processing units.

12. The computer system according to claim 1, wherein the processing requirements comprise a processing capacity required to execute the given task.

13. A computer system comprising:
a plurality of processing units, each of the plurality of processing units adapted to execute tasks thereon, and at least two of the plurality of processing units having different energy efficiencies; and
a scheduler adapted to schedule a given task for execution by one of said plurality of processing units by querying said plurality of processing units in a partial order of descending energy efficiency to one of accept and reject the execution of the given task until one of the given task is one of accepted and executed by said one of said plurality of processing units and the given task is rejected by all of said plurality of processing units;
wherein said scheduler is adapted to schedule the given task in an order based on an attribute list, wherein the attribute list comprising a plurality of attributes, said plurality of attributes comprising (a) a task identification number of the given task, (b) a quantity of said plurality of processing units capable of executing the given task, (c) a processor identification number for each of the quantity of said plurality of processing units capable of executing the given task, (d) an address of the location of the given task associated with each of the of the quantity of said plurality of processing units capable of executing the given task; and (e) a worst case quantity of processing unit cycles for timely executing the given task for each of the quantity of said plurality of processing units capable of executing the given task.

14. The computer system according to claim 13, wherein said scheduler is a function embodied within one of said plurality of processing units.

15. The computer system according to claim 13, wherein said scheduler is a function embodied within a hardware component other than one of said plurality of processing units.

16. The computer system according to claim 13, wherein said scheduler intercepts interrupts from each of said plurality of processing units and peripheral devices.

17. The computer system according to claim 13, wherein said plurality of processing units share memory space.

18. The computer system according to claim 13, wherein said plurality of processing units share input/output space.

19. The computer system according to claim 13, wherein said plurality of processing units share input/output space, and said scheduler and said plurality of processing units share memory space.

20. The computer system according to claim 13, further comprising a task attribute store adapted to store at least some of the processing requirements of at least some of the tasks.

21. The computer system according to claim 13, wherein said scheduler is further adapted to exclude any of said plurality of processing units from the partial order based upon at least one predefined condition.

22. The computer system according to claim 13, wherein the processing requirements comprise a processing capacity required to execute the given task.

23. A computer system comprising:
at least two processing units having different energy efficiencies and adapted to one of accept and reject scheduled tasks based upon processing requirements of the scheduled tasks and a corresponding processing capability, and to at least execute the scheduled tasks that are accepted; and
a scheduler adapted to schedule a given task for execution by one of said at least two processing units so as to consume a least amount of energy, and to rescheduled the given task for execution by an other of said at least two processing units when said one of said at least two processing units rejects the execution of the given task;
wherein the scheduler is adapted to send a request interrupt to each of the at least two processing units in an attribute list, one processing unit at a time, for requesting whether the each of the at least processing units is capable of executing the given task;
wherein the scheduler is adapted to send the request interrupt to each of the at least two processing units in the attribute list until one of (a) the one processing unit sends an accept interrupt to the scheduler accepting the given task, and (b) all of the at least two processing units in the attribute list send a reject interrupt to the scheduler rejecting the given task.

24. The computer system according to claim 23, wherein said scheduler is a function embodied within a hardware component other than said at least two processing units.

25. The computer system according to claim 23, wherein one of said at least two processing units comprise said scheduler.

26. The computer system according to claim 23, wherein said scheduler is further adapted to intercept interrupts from said at least two processing units and peripheral devices.

27. The computer system according to claim 23, wherein said at least two processing units share memory space.

28. The computer system according to claim 23, wherein said at least two processing units share input/output space.

29. The computer system according to claim 23, wherein said at least two processing units share input/output space, and said scheduler and said at least two processing units share memory space.

30. A computer system comprising:
- a plurality of processing units, each of the plurality of processing units adapted to execute tasks thereon, and at least two of the plurality of processing units having different energy efficiencies;
- a processor attribute table adapted to store processing capability information for at least some of said plurality of processors and to update the processing capability information dynamically when the processing capability information changes, wherein the processing capability information comprises (a) processing requirements of a given task, and (b) processing capability for at least some of the plurality of processing units for executing the given task; and
- a scheduler adapted, for the given task, to retrieve at least some of the processing capability information from said processor attribute table in one of a partial order and a strict order of descending energy efficiency until one of the plurality of processors is found to possess adequate processing capability with respect to task processing requirements for the given task, and to schedule the given task for execution by said one of the plurality of processors.

31. The computer system according to claim 30, wherein said computer system further comprises at least one functional block adapted to perform at least one function associated with an interrupt.

32. The computer system according to claim 30, wherein said computer system further comprises at least one functional block adapted to perform at least one function utilized by a task.

* * * * *